United States Patent
Yang et al.

(10) Patent No.: US 12,010,044 B2
(45) Date of Patent: Jun. 11, 2024

(54) METHOD FOR MANAGING DATA THROUGHPUT

(71) Applicant: GT BOOSTER INC., Hsinchu (TW)

(72) Inventors: Shun Yuan Yang, Hsinchu (TW); Chiao Min Hu, Hsinchu (TW); Wei Teng Tai, Hsinchu (TW)

(73) Assignee: GT BOOSTER INC., Hsinchu (TW)

( * ) Notice: Subject to any disclaimer, the term of this patent is extended or adjusted under 35 U.S.C. 154(b) by 206 days.

(21) Appl. No.: 17/496,449

(22) Filed: Oct. 7, 2021

(65) Prior Publication Data

US 2022/0329542 A1 Oct. 13, 2022

(30) Foreign Application Priority Data

Apr. 7, 2021 (TW) ................. 110112496

(51) Int. Cl.
*H04L 49/90* (2022.01)
*H04L 41/50* (2022.01)

(52) U.S. Cl.
CPC ............. *H04L 49/90* (2013.01); *H04L 41/50* (2013.01)

(58) Field of Classification Search
CPC ..... H04L 49/90; H04L 41/50; H04L 43/0888; H04L 43/0894
See application file for complete search history.

(56) References Cited

U.S. PATENT DOCUMENTS

| | | | | |
|---|---|---|---|---|
| 8,072,998 B2* | 12/2011 | Sindhu | ............... | H04L 47/10 370/389 |
| 2005/0216822 A1* | 9/2005 | Kyusojin | ............... | H04L 47/31 715/205 |
| 2013/0051237 A1* | 2/2013 | Ong | ............... | H04L 47/522 370/237 |
| 2018/0026866 A1* | 1/2018 | Williams | ............... | H04L 43/0876 709/224 |
| 2021/0306902 A1* | 9/2021 | Williams | ............... | H04W 80/02 |

* cited by examiner

*Primary Examiner* — Nishant Divecha
(74) *Attorney, Agent, or Firm* — HSML P.C.

(57) ABSTRACT

A method for managing data throughput of a network device is provided. The method includes: determining a network communication as belonging to a first class or a second class; enqueuing each packet received through the network communication determined as belonging to the first class to a first queue, and enqueuing each packet received through the networking communication determined as belonging to the second class to a second queue; dequeuing the first and second queues at a dequeuing ratio; determining a data rate of dequeuing the second queue; and adjusting the dequeuing ratio based on the data rate of dequeuing the second queue thus determined, a total bandwidth, and a guaranteed minimum bandwidth for the network communication determined as belonging to the first class.

9 Claims, 3 Drawing Sheets

METHOD FOR MANAGING DATA THROUGHPUT

CROSS-REFERENCE TO RELATED APPLICATION

This application claims priority of Taiwanese Invention Patent Application No. 110112496, filed on Apr. 7, 2021.

FIELD

The disclosure relates to a method for managing data throughput, and more particularly to a method for managing data throughput of a network device.

BACKGROUND

To guarantee smooth transmission of data for a high-priority network service (e.g., audio-video playing or online gaming) that requires guaranteed network performance that is free of lag or latency, a conventional approach is to reserve and dedicate a fixed bandwidth for the high-priority network service. However, in such approach, even when unoccupied, the fixed bandwidth reserved for the high-priority network service cannot be utilized by other low-priority network service (e.g., webpage browsing or file downloading) that is non-critical or not sensitive to network performance. Additionally, due to the lack of flexibility, the fixed bandwidth may be insufficient to support smooth transmission of data for the high-priority network service when an instantaneous data rate for the high-priority network service suddenly exceeds the fixed bandwidth, resulting in latency or failure of the high-priority network service.

SUMMARY

Therefore, an object of the disclosure is to provide a method for managing data throughput of a network device in one of an uploading direction and a downloading direction that can alleviate at least one of the drawbacks of the prior art.

According to the disclosure, the method includes steps of:
 determining each network communication, through which the network device transmits data, as belonging to which one of a first class related to a network service that requires a greater bandwidth for smooth transmission of data, and a second class related to a network service that requires a less bandwidth, the first class of a network communication having a guaranteed minimum bandwidth reserved therefor;
 for each data packet that is received by the network device through the network communication determined as belonging to the first class, enqueuing the data packet to a first queue;
 for each data packet that is received by the network device through the network communication determined as belonging to the second class, enqueuing the data packet to a second queue;
 dequeuing the first queue and the second queue at a dequeuing ratio by transmitting each data packet enqueued to the first queue through the network communication determined as belonging to the first class and transmitting each data packet enqueued to the second queue through the network communication determined as belonging to the second class, the dequeuing ratio being a ratio of an amount of data packets dequeued from the first queue to an amount of data packets dequeued from the second queue;
 determining a data rate of dequeuing the second queue; and
 adjusting the dequeuing ratio based on the data rate of dequeuing the second queue thus determined, a total bandwidth for the network device, and the guaranteed minimum bandwidth for the network communication as the first class.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
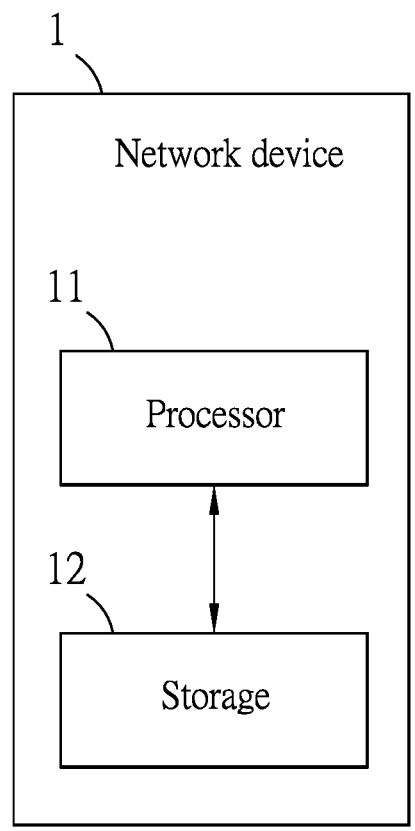
FIG. 1 is a block diagram illustrating an embodiment of a network device according to the disclosure.

Referring to FIG. 1, an embodiment of a network device 1 is provided to implement a method for managing data throughput of the network device 1 in one of an uploading direction and a downloading direction according to the disclosure. The network device 1 may be a router or an endpoint device (e.g., a personal computer, a mobile phone, a server or any device that has a network communication ability).

In the case that the network device 1 is an endpoint device, transmission in the uploading direction means data transmission from the network device 1 to another endpoint device via a router, and transmission in the downloading direction means data transmission from another endpoint device to the network device 1 via a router. In the case that the network device 1 is a router, the network device 1 receives data from an endpoint device, and then transmits the data to another endpoint device, and transmission in the downloading direction means that the network device 1 receives data from an endpoint device, and transmission in the downloading direction means that the network device 1 transmits the data to another endpoint device.

The network device 1 includes a processor 11 and a storage 12.

The processor 11 may be implemented by a central processing unit (CPU), a microprocessor, a micro control unit (MCU), a system on a chip (SoC), or any circuit configurable/programmable in a software manner and/or hardware manner to implement functionalities discussed in this disclosure.

The storage 12 may be implemented by flash memory, a hard disk drive (HDD) or a solid state disk (SSD), electrically-erasable programmable read-only memory (EEPROM) or any other non-volatile memory devices, but is not limited thereto.

Figure 2:
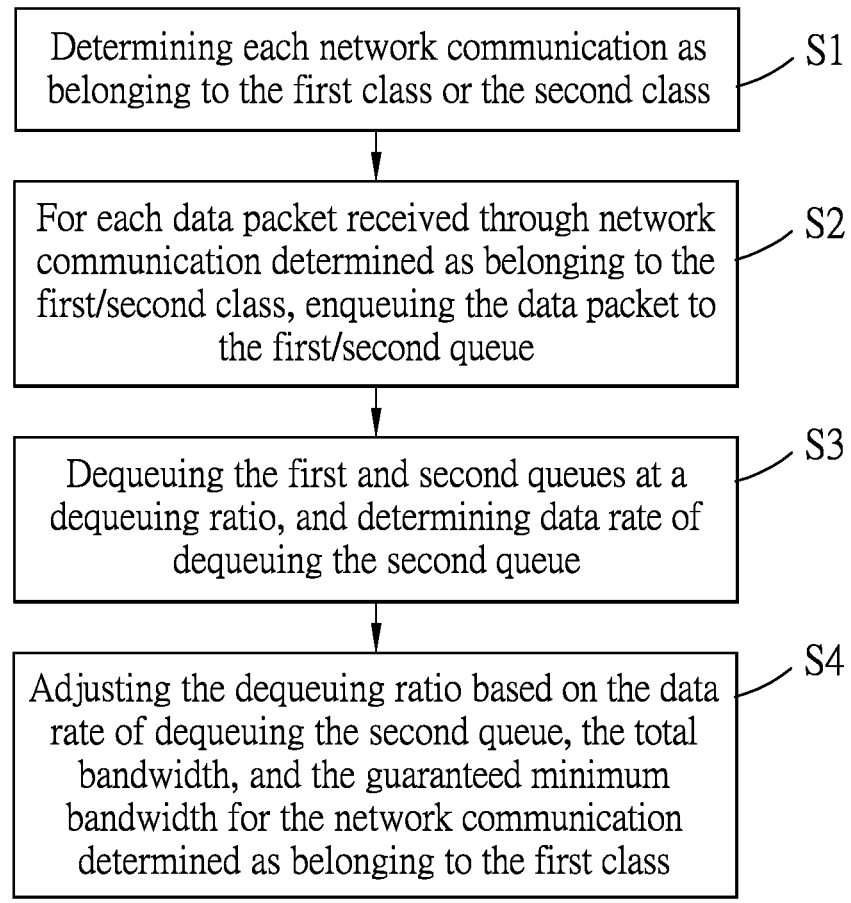
FIG. 2 is a flowchart illustrating an embodiment of a method for managing data throughput of a network device according to the disclosure.

Referring to FIG. 2, the method for managing data throughput of the network device 1 includes steps S1 to S4 delineated below according to an embodiment of this disclosure.

In step S1, the processor 11 of the network device 1 determines each network communication, through which the network device 1 transmits data, as belonging to which one of a first class and a second class. The first class of network communication is related to a network service that requires a greater bandwidth for smooth transmission of data and guaranteed network performance that is free of lag or latency. The first class of network communication generally has a guaranteed minimum bandwidth reserved therefor. The second class of network communication is related to a network service that requires a smaller bandwidth because occurrence of some latency in this network service does not have too much impact on user experience (i.e., the network service is non-critical or not sensitive to network performance). In this embodiment, the processor 11 determines a network communication that is related to the network service of audio-video playing or online gaming as belonging to the first class, and determines a network communication that is not related to the network service of audio-video playing or online gaming (e.g. webpage browsing, file transmitting or file downloading) as belonging to the second class.

It should be noted that when the network device 1 is the endpoint device, determination of the class of the network communication made by the processor 11 is based on a file attribute or an application program name of an application program that establishes the network communication currently under class-determination. When the network device 1 is the router, determination of the class of the network communication made by the processor 11 is based on information of a file attribute or an application program name indicated by a data packet received through the network communication under discussion, or based on a communication protocol of the network communication (e.g., network communication using Port 21 uses the File Transfer Protocol (FTP) for file transmission and thus is determined as belonging to the second class), or based on deep packet inspection.

It is worth to note that in one embodiment, the processor 11 determines which one of the first class and the second class the network communication belongs to at first. Subsequently, the processor 11 further determines the network communication of the first class as belonging to which one of N1 number of first subclasses of the first class, and further determines the network communication of the second class as belonging to which one of N2 number of second subclasses of the second class, where each of N1 and N2 is a positive integer. Hereinafter, this embodiment will be referred to as a subclass case. For example, the N1 number of first subclasses include a subclass related to audio-video playing, a subclass related to online gaming, and a subclass related to instant communication (e.g., network services utilized by "Zoom" or "Line" application programs), and the N2 number of second subclasses include a subclass related to webpage browsing, a subclass related to file transmitting, a subclass related to file downloading, and a subclass related to video streaming (e.g., network services provided by "YouTube" or "bilibili" websites).

In step S2, for each data packet that is received by the processor 11 of the network device 1 through the network communication determined as belonging to the first class, the processor 11 enqueues the data packet to a first queue. Further in step S2, for each data packet that is received by the processor 11 through the network communication determined as belonging to the second class, the processor 11 enqueues the data packet to a second queue. It is worth to note that the first queue and the second queue are stored in the storage 12 of the network device 1, and enqueuing the data packet to the first/second queue is performed by using a weighted fair queueing (WFQ) algorithm, such as a dynamic WFQ algorithm.

For the subclass case, the first queue includes N1 number of first sub-queues that correspond respectively to the N1 number of first subclasses, and for each data packet that is received by the processor 11 of the network device 1 through the network communication determined as belonging to one of the N1 number of first subclasses, the processor 11 enqueues the data packet to a corresponding one of the N1 number of first sub-queues. Similarly, the second queue includes N2 number of second sub-queues that correspond respectively to the N2 number of second subclasses, and for each data packet that is received by the processor 11 of the network device 1 through the network communication determined as belonging to one of the N2 number of second subclasses, the processor 11 enqueues the data packet to a corresponding one of the N2 number of second sub-queues.

In step S3, the processor 11 of the network device 1 dequeues the first queue and the second queue at a dequeuing ratio by transmitting each data packet enqueued to the first queue through the network communication determined as belonging to the first class and transmitting each data packet enqueued to the second queue through the network communication determined as belonging to the second class at the dequeing ratio. Note that the order of processing data packets with respect to a same queue complies with a first-in-first-out principle, i.e., the order of data packets being enqueued to the queue is the same as the order of data packets being dequeued from the queue. The dequeuing ratio is a ratio of a number of data packets dequeued from the first queue to a number of data packets dequeued from the second queue, and is calculated as a ratio of a first weight (W1) of the first queue to a second weight (W2) of the second queue where the first weight (W1) and the second weight (W2) are obtained according to the WFQ algorithm. At the same time, the processor 11 determines a data rate of dequeuing the first queue and a data rate of dequeuing the second queue. In a scenario that the first weight (W1) of the first queue and the second weight (W2) of the second queue are both one, i.e., W1=1 and W2=1, the dequeuing ratio would be 1:1. That means, whenever the processor 11 dequeues the first queue to remove one data packet from the first queue, the processor 11 dequeues the second queue to remove one data packet from the second queue, correspondingly.

For the subclass case, the processor 11 of the network device 1 dequeues the N1 number of first sub-queues and dequeues the N2 number of second sub-queues in step S3. Also, the processor 11 determines the data rate of dequeuing the first queue as a sum of data rates of dequeuing the N1 number of first sub-queues, and determines the data rate of dequeuing the second queue as a sum of data rates of dequeuing the N2 number of second sub-queues. Moreover, the first weight (W1) of the first queue is a sum of respective weights (W11, W12, . . . , W1N1) of the N1 number of first sub-queues, i.e., W1=W11+W12+ . . . +W1N1. Similarly, the second weight (W2) of the second queue is a sum of respective weights (W21, W22, . . . , W2N2) of the N2 number of second sub-queues, i.e., W2=W21+W22+ . . . +W2N2. The weights (W11, W12, . . . , W1N1) respectively of the N1 number of first sub-queues and the weights (W21, W22, . . . , W2N2) respectively of the N2 number of second sub-queues are obtained according to the WFQ algorithm.

In step S4, the processor 11 of the network device 1 adjusts the dequeuing ratio based on the data rate of dequeuing the second queue thus determined, a total bandwidth for the network device 1, and the guaranteed minimum bandwidth for the network communication determined as belonging to the first class. It should be noted that the total bandwidth herein is a maximal bandwidth (rate of data transfer) which the network device 1 can support in one of the uploading direction and the downloading direction, rather than an actual bandwidth (current rate of data transfer) at which the network device 1 is communicating with other network devices. In one embodiment, the total bandwidth has a predetermined numerical value, and is for example, 1000 Mbps.

Specifically speaking, the processor 11 of the network device 1 calculates, for the network communication determined as belonging to the second class, an available bandwidth that is equal to the guaranteed minimum bandwidth subtracted from the total bandwidth. Then, the processor 11 determines whether the data rate of dequeuing the second queue is smaller than the available bandwidth. When it is determined that the data rate of dequeuing the second queue is smaller than the available bandwidth, the processor 11 makes the dequeuing ratio equal to a first value that is a positive integer, e.g., one (1:1). On the other hand, when it is determined that the data rate of dequeuing the second queue is not smaller than the available bandwidth, the processor 11 makes the dequeuing ratio equal to a second value that is greater than the first value and that is a positive integer, e.g., three (3:1).

In some embodiments, the processor 11, in step S4, gradually increases the dequeuing ratio when it is determined that the data rate of dequeuing the second queue is increasing. More specifically, when it is determined that the data rate of dequeuing the second queue is smaller than a lower reference value, the processor 11 makes the dequeuing ratio equal to a lower ratio value ($V_1$). The lower reference value is expressed by (B−R1*$K_1$), where B is the total bandwidth, R1 is the guaranteed minimum bandwidth, and $K_1$ is a predetermined parameter. When it is determined that the data rate of dequeuing the second queue is within a range of greater than (B−R1*$K_{i-1}$) and not greater than (B−R1*$K_i$), the processor 11 makes the dequeuing ratio equal to a predetermined ratio value ($V_i$), where i is a variable that is a positive integer ranging from 2 to N−1, each $K_i$ ($K_2$, $K_3$, . . . , $K_{N-1}$) is a parameter having a predetermined value not smaller than one, and N is a predetermined parameter that is a positive integer and represents a number of ranges, in which the data rate of dequeuing the second queue may fall. When it is determined that the data rate of dequeuing the second queue is greater than an upper reference value, the processor 11 makes the dequeuing ratio equal to an upper ratio value ($V_5$), where the upper reference value is expressed by (B−R1*$K_N$). It should be noted that $K_i$, N, the lower ratio value ($V_1$), the predetermined ratio value ($V_i$) and the upper ratio value ($V_N$) are determined by a user based on practical requirements and actual network conditions.

In one embodiment, the predetermined parameter of N is equal to 3, the predetermined parameter of $K_1$ is equal to 2, the predetermined parameter of $K_2$ is equal to 1, the lower ratio value ($V_1$) is equal to 1 (i.e., W1:W2=1:1), the predetermined ratio value ($V_2$) is equal to 2 (i.e., W1:W2=2:1), and the upper ratio value ($V_3$) is equal to 3 (i.e., W1:W2=3:1). For example, in a case that the total bandwidth (B) is 300 Mbps and the guaranteed minimum bandwidth (R1) is 60 Mbps, the data rate of dequeuing the second queue may fall in a first range of not greater than the lower reference value (B−R1*$K_1$=300−60*2=180), a second range of greater than the lower reference value (180 Mbps) and not greater than the upper reference value (B−R1*$K_N$=300−60*1=240), or a third range of greater than the upper reference value (240 Mbps). The dequeuing ratio is equal to 1 when the data rate of dequeuing the second queue is not greater than 180 Mbps, is equal to 2 when the data rate of dequeuing the second queue is greater than 180 Mbps and not greater than 240 Mbps, and is equal to 3 when the data rate of dequeuing the second queue is greater than 240 Mbps.

In one embodiment, the predetermined parameter of N is equal to 4, the predetermined parameter of $K_1$ is equal to 3, the predetermined parameter of $K_2$ is equal to 2, the predetermined parameter of $K_3$ is equal to 1, the lower ratio value ($V_1$) is equal to 1 (i.e., W1:W2=1:1), the predetermined ratio value ($V_2$) is equal to 2 (i.e., W1:W2=2:1), the predetermined ratio value ($V_3$) is equal to 3 (i.e., W1:W2=3:1), and the upper ratio value ($V_4$) is equal to 4 (i.e., W1:W2=4:1). For example, in the case that the total bandwidth (B) is 300 Mbps and the guaranteed minimum bandwidth (R1) is 60 Mbps, the data rate of dequeuing the second queue may fall in a first range of not greater than 120 Mbps (B−R1*$K_1$=300−60*3=120), a second range of greater than 120 Mbps and not greater than 180 Mbps (B−R1*$K_2$=300−60*2=180), a third range of greater than 180 Mbps and not greater than 240 Mbps (B−R1*$K_3$=300−60*1=240), or a fourth range of greater than 240 Mbps. The dequeuing ratio is equal to 1 when the data rate of dequeuing the second queue is not greater than 120 Mbps, is equal to 2 when the data rate of dequeuing the second queue is greater than 120 Mbps and not greater than 180 Mbps, is equal to 3 when the data rate of dequeuing the second queue is greater than 180 Mbps and not greater than 240 Mbps, and is equal to 4 when the data rate of dequeuing the second queue is greater than 240 Mbps.

In one embodiment, the predetermined parameter of N is equal to 5, the predetermined parameter of $K_1$ is equal to 4, the predetermined parameter of $K_2$ is equal to 3, the predetermined parameter of $K_3$ is equal to 2, the predetermined parameter of $K_4$ is equal to 1, the lower ratio value ($V_1$) is equal to 1 (i.e., W1:W2=1:1), the predetermined ratio value ($V_2$) is equal to 2 (i.e., W1:W2=2:1), the predetermined ratio value ($V_3$) is equal to 3 (i.e., W1:W2=3:1), the predetermined ratio value ($V_4$) is equal to 4 (i.e., W1:W2=4:1), and the upper ratio value ($V_5$) is equal to 5 (i.e., W1:W2=5:1).

In this way, the first weight (W1) of the first queue is kept equal to or greater than the second weight (W2) of the second queue. The closer the data rate of dequeuing the second queue is to the available bandwidth (B−R1), the greater the value of the dequeuing ratio. Thus, when the data rate of dequeuing the second queue is increasing, it would be reduced to a reasonable level which would not result in a communication breakdown, and smooth transmission of data for the high-priority network service is maintained, and hence network performance of online gaming or audio-video playing is guaranteed.

Figure 3:
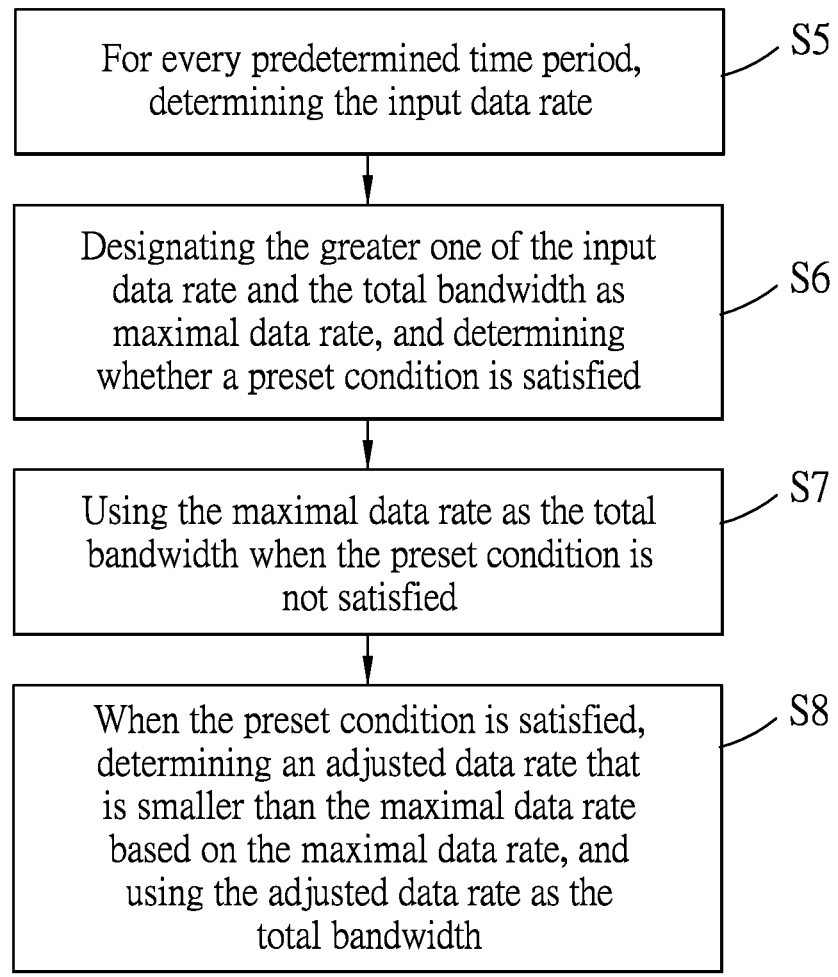
FIG. 3 is a flow chart illustrating another embodiment of a method for managing data throughput of a network device according to the disclosure.

Referring to FIG. 3, in one embodiment, the method further includes steps S5 to S8 delineated below.

In step S5, for every predetermined time period (e.g., 10 seconds), the processor 11 of the network device 1 determines an input data rate that is a data rate of receiving data packets by the network device 1 through the network communication during the predetermined time period. It should be noted that the input data rate is determined for only one of the uploading direction and the downloading direction of the network communication.

In step S6, the processor 11 of the network device 1 designates the greater one of the input data rate and the total bandwidth as a maximal data rate. It should be noted that at the beginning of using the network device 1, the total bandwidth is designated as the maximal data rate and is set to be zero as an initial value of the maximal data rate, and the input data rate will be designated as the maximal data rate when the input data rate is greater than the total bandwidth, which is equal to zero at first. However, the total bandwidth may also be initially set to have any non-zero value.

Then, the processor 11 determines whether a preset condition is satisfied. When it is determined that the preset condition is not satisfied, the flow of procedure proceeds to step S7. Oppositely, when it is determined that the preset condition is satisfied, the flow of procedure proceeds to step S8.

In one embodiment, the preset condition is that a preset time period has elapsed. The preset time period is exemplarily twelve hours.

In one embodiment, the preset condition is that a first preset time period has elapsed and the input data rate continues to be smaller than the total bandwidth for a second preset time period. In this embodiment, the first preset time period is exemplarily twelve hours, and the second preset time period is exemplarily two hours, but implementations of the first preset time period and the second preset time period are not limited to the disclosure herein and may vary in other embodiments.

In one embodiment, the preset condition is that network congestion occurs in the network communication. In particular, the processor 11 determines whether network congestion occurs in the network communication by determining whether packet loss occurs in the network communication. In other embodiments, the processor 11 may determine whether network congestion occurs by determining whether network congestion has occurred or is going to occur based on an estimated index.

For example, with respect to communication under transmission control protocol (TCP), when a sender transmits a data segment, the sender initializes a retransmission timeout (RTO) timer which estimates an arrival time of an acknowledgement for the transmitted data segment. The sender (e.g., the processor 11) determines that the transmitted data segment may be damaged or lost and retransmits the same data segment when the sender receives no acknowledgement by the time the RTO timer expires (i.e., the arrival time has elapsed). It is worth to note that retransmission of data packets can be utilized as the estimated index to determine whether network congestion has occurred.

In step S7, the processor 11 of the network device 1 uses the maximal data rate as the total bandwidth for the network device 1. That is to say, the total bandwidth in the uploading direction is equal to the maximal data rate in the uploading direction when the input data rate is determined with respect to the uploading direction; and the total bandwidth in the downloading direction is equal to the maximal data rate in the downloading direction when the input data rate is determined with respect to the downloading direction.

In step S8, the processor 11 of the network device 1 determines an adjusted data rate that is smaller than the maximal data rate based on the maximal data rate, and uses the adjusted data rate as the total bandwidth for the network device 1.

In one embodiment, the processor 11 of the network device 1 calculates the adjusted data rate by multiplying the maximal data rate by a preset percentage ranging between 0% and 100%, e.g., 90%.

In one embodiment, the processor 11 of the network device 1 calculates the adjusted data rate by subtracting a preset rate from the maximal data rate, where the preset rate ranges between 0 and the maximal data rate, and is exemplarily 10 Mbps.

In one embodiment where the preset condition is that a preset time period of twelve hours have elapsed, the processor 11 reduces the total bandwidth by 10% or by 10 Mbps every twelve hours.

In one embodiment, when it is determined by the processor 11 that twelve hours have elapsed and the input data rate continues to be smaller than the total bandwidth for two hours, the processor 11 reduces the total bandwidth by 10% or by 10 Mbps.

In one embodiment, when it is determined by the processor 11 that network congestion occurs in the network communication, the processor 11 reduces the total bandwidth by 10% or by 10 Mbps.

In summary, the method for managing data throughput according to the disclosure utilizes the network device 1 to determine the class (the first class or the second class) each network communication belongs to, to enqueue each data packet received through the network communication determined as belonging to the first class or the second class to a corresponding one of the first and second queues, to dequeue the first and second queues at the dequeuing ratio, to determine the data rate of dequeuing the second queue, and to adjust the dequeuing ratio based on the data rate of dequeuing the second queue thus determined, the total bandwidth for the network device 1, and the guaranteed minimum bandwidth for the network communication determined as belonging to the first class. In this way, high communication performance for every network communication that is determined as belonging to the first class may be guaranteed, and hence the quality of service (QoS) of the network service may be improved. Moreover, the network device 1 is able to dynamically reduce the total bandwidth for the network device 1 when the network communication is not in a good condition (e.g., network congestion occurs) and support for the originally designated total bandwidth is adversely affected. Therefore, stability of the network communication may be maintained.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method for managing data throughput of a network device in one of an uploading direction and a downloading direction, the method comprising steps of:
   determining each network communication, through which the network device transmits data, as belonging to which one of a first class related to a network service that requires a greater bandwidth for smooth transmission of data, and a second class related to a network service that requires a less bandwidth, the first class of network communication having a guaranteed minimum bandwidth reserved therefor;
   for each data packet that is received by the network device through the network communication determined as belonging to the first class, enqueuing the data packet to a first queue;
   for each data packet that is received by the network device through the network communication determined as belonging to the second class, enqueuing the data packet to a second queue;
   dequeuing the first queue and the second queue at a dequeuing ratio by transmitting each data packet enqueued to the first queue through the network communication determined as belonging to the first class and transmitting each data packet enqueued to the second queue through the network communication determined as belonging to the second class, the dequeuing ratio being a ratio of an amount of data packets dequeued from the first queue to an amount of data packets dequeued from the second queue;
   determining a data rate of dequeuing the second queue; and
   adjusting the dequeuing ratio based on the data rate of dequeuing the second queue thus determined, a total bandwidth for the network device, and the guaranteed minimum bandwidth for the network communication determined as belonging to the first class,
   wherein the step of adjusting the dequeuing ratio includes gradually increasing the dequeuing ratio when the data rate of dequeuing the second queue is increasing, and
   wherein the adjusting the dequeuing ratio includes:
   making the dequeuing ratio equal to a lower ratio value when the data rate of dequeuing the second queue is smaller than a lower reference value, the lower reference value being expressed by $(B-R1*K_1)$, where B is the total bandwidth, R1 is the guaranteed minimum bandwidth, and $K_1$ is a predetermined parameter;
   making the dequeuing ratio equal to a predetermined ratio value $(V_i)$ when the data rate of dequeuing the second queue is within a range of greater than $(B-R1*K_{i-1})$ and not greater than $(B-R1*K_i)$, where i is a variable that is a positive integer ranging from 2 to N−1, each $K_i$ is a parameter having a predetermined value not smaller than one, and N is a predetermined parameter that is a positive integer and represents a number of ranges in which the data rate of dequeuing the second queue may fall; and
   making the dequeuing ratio equal to an upper ratio value when the data rate of dequeuing the second queue is greater than an upper reference value, the upper reference value being expressed by $(B-R1*K_N)$.

2. The method as claimed in claim 1, wherein the step of identifying each network communication includes identifying the network communication that is related to the network service of audio-video playing and online gaming as the first class, and determining the network communication that is not related to the network service of audio-video playing or online gaming as belonging to the second class.

3. The method as claimed in claim 1, wherein N is equal to 3, $K_1$ is equal to 2, $K_2$ is equal to 1, the lower ratio value is equal to 1, $V_2$ is equal to 2, and the upper ratio value is equal to 3.

4. The method as claimed in claim 1, further comprising steps of:
   for every predetermined time period, determining an input data rate that is a data rate of receiving data packets by the network device through the network communication during the predetermined time period;
   designating the greater one of the input data rate and the total bandwidth as a maximal data rate;
   determining whether a preset condition is satisfied;
   using the maximal data rate as the total bandwidth for the network device when the preset condition is not satisfied; and
   determining an adjusted data rate that is smaller than the maximal data rate based on the maximal data rate, and using the adjusted data rate as the total bandwidth for the network device when the preset condition is satisfied.

5. The method as claimed in claim 4, wherein the step of determining an adjusted data rate includes calculating the adjusted data rate by multiplying the maximal data rate by a preset percentage ranging between 0% and 100%.

6. The method as claimed in claim 4, wherein the step of determining an adjusted data rate includes calculating the adjusted data rate by subtracting a preset rate from the maximal data rate, the preset rate ranging between 0 and the maximal data rate.

7. The method as claimed in claim 4, wherein the preset condition is that a preset time period has elapsed.

8. The method as claimed in claim 4, wherein the preset condition is that a first preset time period has elapsed and the input data rate continues to be smaller than the total bandwidth for a second preset time period.

9. The method as claimed in claim 4, wherein the preset condition is that network congestion occurs in the network communication.

* * * * *